United States Patent Office 3,364,258
Patented Jan. 16, 1968

3,364,258
PROCESS FOR MANUFACTURING ORGANIC SULPHOCHLORIDES
Jan Ide de Jong, Blaricum, Netherlands, assignor to Koninklijke Zwavelzuurfabrieken Voorheen Ketjen N.V., Amsterdam, Netherlands, a limited-liability company of the Netherlands
No Drawing. Filed May 24, 1963, Ser. No. 282,888
9 Claims. (Cl. 260—543)

The invention relates to a process for the manufacture of organic sulphochlorides, particularly benzene sulphochloride and toluene sulphochloride, by reacting organic sulphonic acids with chloro sulphonic acid in the presence of an organic solvent.

It is known to prepare organic sulphochlorides by reacting an organic sulphonic acid with chloro sulphonic acid according to the general equation $$RSO_3H + ClSO_3H = RSO_2Cl + H_2SO_4 \qquad (1)$$

(in which R represents an organic radical).

In this process, an excess of chloro sulphonic acid is generally used in order to obtain a satisfactory yield of organic sulphochloride.

Difficulties are encountered in separating the organic sulphochloride from the mixture obtained as a result of the reaction. Although the organic sulphochloride can be distilled off, the accompanying increase in temperature and the concentration of the sulphuric acid during the distillation cause resinifications and carbonisations to occur.

It has now been found that the difficulties mentioned above are avoided, for the most part, by reacting the chloro sulphonic acid with the benzene or toluene sulphonic acid in the presence of a solvent for the sulphochloride in which both sulphuric acid and the benzene or toluene sulphonic acid are insoluble, such solvent being capable of forming a liquid solvent phase beside the acid phase which is present and further being inert to the reaction components.

By using this process according to the present invention high yields with respect to chloro sulphonic acid can be obtained, as will appear from the examples given below. In these examples little or no excess of chloro sulphonic acid has been used, and it will be apparent that the yield can be further increased if an excess of chloro sulphonic acid is used.

According to the invention, chloro sulphonic acid is reacted with benzene or toluene sulphonic acid in the presence of a suitable solvent having the above described characteristics at a temperature below 70° C., preferably between 20 and 40° C. The benzene or toluene sulphochloride produced by this reaction collects in the solvent phase. After the reaction is completed, the reaction mixture is made up of a solvent phase and a sulphuric acid phase which are separated. The solvent phase, which contains, in addition to the desired sulphochloride, some sulphones and also a part of the unreacted chloro sulphonic acid, is washed until acid-free. Then the solvent is distilled off, whereby the water, that is still present, is removed azeotropically. If necessary, more solvent is added, or the solvent is recirculated until all the water has been removed. Then the temperature is raised in order to separate the rest of the solvent from the sulphochloride by means of distillation. In this way, if starting with about equivalent quantities of chloro sulphonic acid and benzene or toluene sulphonic acid, sulphochloride yields of 80% or more of the theoretical yield can be attained, as compared with maximum yields of 60% of the theoretical yield previously attained by the reaction in the absence of the solvent.

The benzene or toluene sulphochloride thus obtained is in a rather pure state; and contains only some sulphones, from which it can be freed by a simple distillation. After these sulphones have been removed, the resulting sulphochloride can withstand temperatures of as high as 195 to 200° C. for at least two hours without disintegration or decomposition.

The solvent may be present from the beginning of the reaction, or it may be added to the benzene or toluene sulphonic acid and chloro sulphonic acid at any stage of the reaction.

It will be apparent that the hydrochloric acid can be recovered from the water used for washing the solvent phase merely by combining this washing water with the sulphuric acid phase.

The process according to the invention has two main advantages. In the first place, the equilibrium according to Equation 1 is moved practically wholly to the right-hand side and, secondly, the added solvent can be recovered unchanged and thus may be used again and again.

A further advantage of the process according to the invention resides in the fact that chloro sulphonic acid is not necessary for the manufacture of the benzene or toluene sulphonic acid from the corresponding hydrocarbons, as the required sulphonation of the organic hydrocarbon may be effected with the aid of the concentrated sulphuric acid from the acid phase that was separated during production of a preceding charge of sulphochloride. Thus, the use of chloro sulphonic acid may be reduced maximally to half the quantity that is otherwise needed.

The separated sulphuric acid phase may still contain unreacted sulphonic acid, and in using this phase for the sulphonation of hydrocarbons such unreacted sulphonic acid is not lost, but can be converted, together with the newly formed sulphonic acid, into sulphochloride. In doing so, the yield of the sulphochloride with respect to organic sulphonic acid is still further increased.

It will be apparent that, in preparing the benzene or toluene sulphonic acid which is to be reacted with chloro sulphonic acid to form the desired sulphochloride, one can sulphonate the hydrocarbons with any sulphonating agent other than the sulphuric acid phase resulting from a preceding reaction.

Numerous solvents can be used for performing the process according to the invention. However, the selected solvent must satisfy the following requirements: first the solvent should be inert with respect to all the reaction components, namely, sulphuric acid, chloro sulphonic acid, sulphonic acid and sulphochloride at the reaction temperatures to be used; and, secondly, the sulphochloride in question should be markedly soluble in the selected solvent.

Examples of suitable solvents are cycloparaffines, such as, cyclohexane, and halogenated aliphatic hydrocarbons, such as, chloroform, carbon tetrachloride, 1,2-di chloro ethane, tetra chloro ethane, and penta chloro fluoro ethane.

The amount of solvent to be used is determined, among other factors, by the solubility of the sulphochloride to be isolated in this solvent. Of course, there must be enough solvent to maintain all of the sulphochloride formed in solution. However, an excess of solvent, does no harm. If the separated acid phase still contains a certain amount of sulphochloride, it is desirable to extract the sulphochloride from this acid phase, by using fresh solvent, which may be passed counter-currently with respect to the acid phase.

In those cases where the sulphuric acid phase still contains a lot of unreacted sulphonic acid, it can be recommended either to work with an excess of chloro sulphonic acid, or to choose another solvent, or to use this phase for the sulphonation of hydrocarbons to form the sulphonic acid to be used in a subsequent charge, as explained above. In this way, very high yields can be obtained.

For the preparation of toluene sulphochloride that is nearly free from isomers, it is not necessary to start with a nearly isomer-free toluene sulphonic acid. Instead, the starting material may be a mixture of isomeric toluene sulphochlorides, and thereafter the isomeric sulphochlorides are separated, for example, by fractionation or by crystallisation. Thus, for example, when sulphonating toluene with sulphuric acid, a mixture predominantly of ortho- and para-toluene sulphonic acid and a little of meta-toluene sulphonic acid is obtained. By fractional crystallisation the isomers can be separated and thereafter converted into the respective sulphochlorides. However, the mixture of isomeric toluene sulphonic acids can also be converted directly into a mixture of isomeric toluene sulphochlorides by the process according to the invention, in which the solvent layer is separated from the sulphuric acid layer before being contacted with water. By reason of the foregoing feature of the invention, the mixture of isomeric toluene sulphochlorides can be separated from the sulphones by a first distillation, and then split up by a fractional distillation. This last mentioned method is preferred because the isomeric toluene sulphochlorides are separable more easily by fractional distillation than are the isomeric toluene sulphonic acids by fractional crystallisation.

The process according to the invention will be further described with reference to the following specific examples which are merely illustrative thereof:

Example 1

Ortho toluene sulphochloride from ortho toluene sulphonic acid:

172 g. of ortho toluene sulphonic acid, 1000 g. of carbon tetrachloride as the solvent, and 130 g. of chloro sulphonic acid were mixed together. Such reaction mixture was stirred for one hour at 40° C. Thereafter, the carbon tetrachloride layer or phase was separated from the acidic layer or phase, and the acidic layer was stirred with 400 g. of fresh carbon tetrachloride for 15 minutes at 40° C., and the solvent phase was separated from the acid phase. Both carbon tetrachloride layers or phases were washed three times with 200 cc. of water and the carbon tetrachloride was distilled off under reduced pressure. Yield of ortho sulphochloride: 170 g. which is equivalent to 89% of the theoretical yield.

Example 2

Para toluene sulphochloride from para toluene sulphonic acid:

172 g. of para toluene sulphonic acid, 1000 g. of carbon tetrachloride as solvent and 130 g. of chloro sulphonic acid were mixed, and thereafter the reaction mixture was stirred for one hour at 40° C. The carbon tetrachloride layer was thereafter separated from the acidic layer. Sulphochloride remaining in the acid layer was extracted from the latter by stirring the acid layer for 15 minutes at 50° C. with 400 g. of carbon tetrachloride and again separating the solvent and acid layers. The collected solvent or carbon tetrachloride layers were washed three times with 200 cc. of water and the carbon tetrachloride was distilled off under reduced pressure. Yield of para toluene sulphochloride: 174 g. which is equivalent to 92% of the theoretical yield.

Example 3

Mixture of ortho, meta and para toluene sulphochloride from a corresponding mixture of sulphonic acids:

172 g. of a mixture of ortho, meta and para toluene sulphonic acids, 1000 g. of carbon tetrachloride as solvent and 130 g. of chloro sulphonic acid were mixed, and thereafter the reaction mixture was stirred for one hour at 40° C. The solvent or carbon tetrachloride layer was then separated from the acidic layer. The acidic layer was stirred for 15 minutes at 40° C. with 1000 g. of carbon tetrachloride to extract remaining sulphochloride therefrom, whereupon, the solvent layer was separated from the acidic layer. The gathered carbon tetrachloride layers were washed three times with 200 cc. of water and the carbon tetrachloride was distilled off under reduced pressure. A yield of 166 g. of the mixture of ortho, meta and para toluene sulphochlorides was obtained, which is equivalent to 87% of the theoretical yield. A first portion of this mixture was thereafter freed from sulphones by flashing off the sulphochlorides from the sulphones, which remained as a bottom product. Subsequently, the mixture of sulphochlorides was separated by fractional distillation into an ortho-rich fraction and a para-rich fraction, whereby the meta fraction was spread over the ortho- and para-fractions. Another portion of the sulphochloride mixture containing sulphones was fractionated directly by distillation into the above mentioned fractions, and a third portion was separated by crystallising out the para-isomers after such third portion was freed from sulphones by a flashing distillation.

Example 4

Preparation of toluene sulphochloride with the aid of the sulphuric acid obtained as a byproduct in a prior chloro sulphonation of toluene sulphonic acid:

92 g. of toluene was sulphonated at 100° C. with the aid of 98 g. of sulphuric acid. This reaction employed an excess of toluene in order to distill off azeotropically the water generated as a result of the sulphonation. In this way, the amount of sulphuric acid used is nearly quantitatively convertible. After the reaction had ended the excess of toluene was distilled off under vacuum. 172 g. of toluene sulphonic acid was obtained. This toluene sulphonic acid then was mixed with 1000 g. of carbon tetra chloride as solvent and 117 g. of chloro sulphonic acid. The reaction mixture was now stirred for one hour at 40° C. The carbon tetrachloride layer was separated from the acidic layer and the latter was washed with a fresh amount of carbon tetrachloride to extract sulphochloride from the acidic layer. 131 g. of toluene sulphochloride was obtained which is equivalent to 69% of the theoretical yield. The extracted acidic layer was now used for the sulphonation of a new charge of toluene. Thus, toluene sulphonic acid was obtained that was converted in the above mentioned manner into toluene sulphochloride. The extraction of the acidic layer to recover the sulphuric acid was executed counter-currently with the same result.

Example 5

The batch process of Example 4 was repeated again and again with the sulphuric acid formed during each chloro sulphonation being used for the sulphonation of the following charge of hydrocarbons.

In each batch, 184 g. of toluene (an excess) was sulphonated by the acidic layer from the preceding batch. In the following table presenting the results of the repeated batch process: column 1 is the number of the charge or batch; column 2 is the amount of toluene sulphonic acid in grams reacted with 117 grams of chloro sulphonic acid in the presence of 1000 grams of carbon tetra chloride in each batch; column 3 is the yield of toluene sulphochloride in grams for each charge; column 4 is the weight of the acidic layer, in grams, obtained from the chloro sulphonation of the related charge and used for the sulphonation of toluene during the next batch process or charge; and column 5 gives the yield as a percentage of the theoretical yield:

TABLE

| 1 | 2 | 3 | 4 | 5 |
|---|---|---|---|---|
| 1 | 172 | 131 | 117 | 69 |
| 2 | 170 | 147 | 114 | 77 |
| 3 | 171 | 160 | 117 | 84 |
| 4 | 175 | 159 | 118 | 83 |
| 5 | 175 | 158 | 121 | 83 |

Example 6

Toluene sulphochloride from toluene sulphonic acid and chlorosulphonic acid in the presence of di chloro ethane:

120 g. of chloro sulphonic acid of 97% was added to a mixture of 172 g. of toluene sulphonic acid and 800 g. of di chloro ethane, and the whole was stirred for one hour at 40° C. The di chloro ethane layer was separated and washed with water until acid-free, and thereafter the di chloro ethane was distilled off under reduced pressure. Yield of toluene sulphochloride: 154 g. which is equivalent to 81% of the theoretical yield.

Example 7

Toluene sulphochloride from toluene sulphonic acid and chloro sulphonic acid in the presence of tetra chloro ethane:

130 g. of chloro sulphonic acid were added to a mixture of 172 g. of toluene sulphonic acid and 1000 g. of tetra chloro ethane, and thereafter the whole reaction mixture was stirred for one hour at 40° C. The tetra chloro ethane layer was separated from the acidic layer, and the latter was extracted by being stirred again for 15 minutes at 40° C. with 1000 g. of tetra chloro ethane whereupon the acidic and solvent layers were separated. The collected solvent or tetra chloro ethane layers were washed with water until acid-free and the tetra chloro ethane was distilled off under reduced pressure. Yield of toluene sulphochloride: 162 g. which is equivalent to 85% of the theoretical yield.

Example 8

Benzene sulphochloride from benzene sulphonic acid and chloro sulphonic acid in the presence of carbon tetra chloride:

79 g. of benzene sulphonic acid, 400 g. of carbon tetra chloride and 70 g. of chloro sulphonic acid were mixed and stirred for one hour at 40° C., and thereafter the carbon tetra chloride layer was separated from the acidic layer. The acidic layer was extracted by being stirred for one hour with 200 g. of carbon tetra chloride, whereupon the acidic and solvent layers were separated. The collected solvent or carbon tetra chloride layers were washed with water until acid-free, whereafter the carbon tetra chloride was distilled off, initially at atmospheric pressure, and then at 100° C. and 5 mm. pressure. Yield of benzene sulphochloride: 67 g. which is equivalent to 75% of the theoretical yield.

Example 9

Toluene sulphochloride from toluene sulphonic acid and chloro sulphonic acid in the presence of cyclohexane:

172 g. of toluene sulphonic acid were stirred for one hour at 40° C. with 117 g. of chloro sulphonic acid and 800 g. of cyclohexane. The cyclohexane layer was separated from the sulphuric acid layer. The acid layer was extracted by being stirred for 15 minutes with 200 g. of cyclohexane; whereupon the acid and solvent layers were separated. The collected cyclohexane layers were washed until acid-free with water, whereupon the cyclohexane was distilled off under reduced pressure. Yield of toluene sulphochloride: 157 g. which is equivalent to 82½% of the theoretical yield.

Although illustrative examples of processes embodying the invention have been given above, it is to be understood that the invention is not limited to those specific processes, and that various changes and modifications may be effected therein within the scope and spirit of the invention as defined in the appended claims.

What is claimed is:

1. In the process for the manufacture of organic sulphochlorides by the reaction of an organic sulphonic acid selected from the group consisting of benzene sulphonic acid and toluene sulphonic acid with an approximately stoichiometric amount of chlorosulphonic acid to form sulphuric acid in the presence of a solvent for the sulphochloride to be produced, which solvent forms a liquid solvent phase separable from the liquid sulphuric acid phase;

the steps, upon completion of said reaction, of first separating said solvent phase containing the produced sulphochloride from the acid phase, only after such separation, washing the separated solvent phase with water until the same is acid-free, and distilling-off the solvent from said solvent phase whereby any water remaining therein is azeotropically removed.

2. A process as in claim 1;

wherein the solvent is distilled-off from the solvent phase at atmospheric pressure; and, thereafter, recirculating the solvent until all water is removed therefrom, distilling-off the rest of the solvent under reduced pressure, and distilling-off the desired sulphochloride, in pure state, from sulphones which remain as a bottom product.

3. A process as in claim 1;

wherein said solvent is selected from the group consisting of cycloparaffines and halogenated aliphatic hydrocarbons.

4. A process as in claim 1;

wherein said solvent is selected from the class consisting of cyclohexane, chloroform, carbon tetra chloride, di chloro ethane, tetra chloro ethane and penta chloro fluoro ethane.

5. A process as in claim 1;

wherein said organic sulphonic acid is reacted with said chloro sulphonic acid in the presence of said solvent at a temperature less than 70° C.

6. A process as in claim 1;

wherein the solvent distilled-off from the solvent phase is collected for reuse in the process.

7. A process as in claim 1;

wherein said organic sulphonic acid is the product of the sulphonation of hydrocarbon by said acid phase.

8. A process as in claim 1;

wherein sulphochloride is extracted from said acid phase by washing the latter with fresh solvent.

9. A process as in claim 1;

wherein said organic sulphonic acid is isomeric so as to produce isomeric organic sulphochlorides, and wherein, following the distilling-off of the solvent, said isomeric sulphochlorides are separated from sulphones by distillation, and then the isomers are split-up by fractional distillation thereof.

References Cited

UNITED STATES PATENTS 2,214,379   9/1940   Moser et al. _____ 260—543

FOREIGN PATENTS 22,472   12/1961   Germany.
11,676   4/1901   Great Britain.

OTHER REFERENCES

Houben-Weyl, Methoden der Organischen Chemie, vol. 9, 1955, pp. 568–569 QD258H7.

LORRAINE A. WEINBERGER, *Primary Examiner.*

RICHARD K. JACKSON, *Examiner.*

B. EISEN, H. C. WEGNER, *Assistant Examiners.*